United States Patent
Kozak et al.

(10) Patent No.: US 6,317,685 B1
(45) Date of Patent: Nov. 13, 2001

(54) METHOD AND SYSTEM FOR PROVIDING ALTERNATE ROUTES WITH A NAVIGATION SYSTEM

(75) Inventors: Frank J. Kozak, Naperville; Lawrence M. Kaplan, Northbrook, both of IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/523,794

(22) Filed: Mar. 13, 2000

(51) Int. Cl.[7] .............. G01C 21/00; G01S 5/00; G01S 13/00; G06F 7/00; G06F 17/00; G06F 19/00

(52) U.S. Cl. .............. 701/210; 701/200; 701/201; 701/202; 701/203; 701/204; 701/205; 701/206; 701/207; 701/208; 701/209; 340/905; 340/989; 340/990; 340/993; 340/995; 705/5; 705/6; 705/7; 705/8; 705/9; 235/914

(58) Field of Search .................. 701/210, 200–209; 340/905, 989, 990, 993, 995; 235/91 H; 324/161, 160; 705/5, 6, 7, 8, 9

(56) References Cited

U.S. PATENT DOCUMENTS

| | | | |
|---|---|---|---|
| 4,153,874 | * | 5/1979 | Kaestner ................ 324/161 |
| 5,204,817 | | 4/1993 | Yoshida . |
| 5,504,683 | | 4/1996 | Gurmu et al. . |
| 5,635,924 | | 6/1997 | Tran et al. . |
| 5,742,922 | | 4/1998 | Kim . |
| 5,758,313 | | 5/1998 | Shah et al. . |
| 5,845,227 | * | 12/1998 | Peterson ................ 701/209 |
| 5,862,509 | * | 1/1999 | Desai et al. ........... 701/209 |
| 6,119,095 | * | 9/2000 | Morita .................. 705/5 |
| 6,144,917 | * | 11/2000 | Walters et al. ........ 701/204 |
| 6,192,314 | * | 2/2001 | Khavakh et al. ....... 701/209 |

FOREIGN PATENT DOCUMENTS

11002536-A * 9/1997 (JP) .

* cited by examiner

*Primary Examiner*—William A. Cuchlinski, Jr.
*Assistant Examiner*—Ronnie Mancho
(74) *Attorney, Agent, or Firm*—Frank J. Kozak; Lawrence M. Kaplan

(57) ABSTRACT

A feature for a navigation system that provides an evaluation of alternate routes. According to this feature, the navigation system compares the actual time of travel along a route to the estimated time of travel along the route. If the actual time of travel exceeds the estimated time of travel, alternate routes to the destination are calculated and provided to the user. This feature enables driver-experienced traffic conditions to be taken into account.

56 Claims, 8 Drawing Sheets

METHOD AND SYSTEM FOR PROVIDING ALTERNATE ROUTES WITH A NAVIGATION SYSTEM

BACKGROUND OF THE INVENTION

The present invention relates to in-vehicle navigation systems and more particularly, the present invention relates to using a navigation system interactively to provide alternate routes while driving.

In-vehicle navigation systems are available that provide end users (such as drivers of the vehicles in which the in-vehicle navigation systems are installed) with various navigating functions and features. For example, some in-vehicle navigation systems are able to determine an optimum route to travel by roads between locations in a geographic region. Using input firm the end user, and optionally from equipment that can determine one's physical location (such as a GPS system), a navigation system can examine various routes between two locations to determine an optimum route to travel from a starting location to a destination location in a geographic region. The navigation system may then provide the end user with information about the optimum route in the form of instructions that identify the driving maneuvers required to be taken by the end user to travel from the starting location to the destination location. The instructions may take the form of visual and/or audio instructions that are provided along the way as the end user is traveling the route. Some navigation systems are able to show detailed maps on computer displays outlining routes to destinations, the types of maneuvers to be taken at various locations along the routes, locations of certain types of features, and so on.

In order to provide these and other navigating functions, navigation systems use geographic data. The geographic data may be in the form of one or more databases that include data that represent physical features in a geographic region. The geographic database may include data representing the roads and intersections in a geographic region and also may include information relating to the represented roads and intersections in the geographic region, such as turn restrictions at intersections, the lengths of the represented roads and/or the distance between intersections along the represented roads, speed limits along the roads, the measured time of travel along the represented roads, street names of the various roads, address ranges along the roads, and so on.

Although navigation systems provide many important features, there continues to be room for improvements. One area in which there is room for improvement relates to using a navigation system to provide route guidance that takes into account driving or traffic conditions experienced by the vehicle driver. For example, a traffic condition may exist that affects how quickly a destination is reached. According to one example, the road ahead of the driver along the calculated route may be backed up with traffic congestion. This could be due to a large number of vehicles being on the roadway all at the same time, or perhaps to a traffic incident causing a temporary delay, or any number of other reasons. Under these circumstances, the calculated route may no longer be the quickest route to the destination, because information upon which the route was calculated may not match present conditions.

It is noted that some in-vehicle navigation systems have been proposed that permit the user to request calculation of an alternate route. In one such system, the user inputs a request for an alternate route calculation, and the system calculates the "next best" route to the destination from the vehicle's current location, and avoids either all or a portion of the original route. In another of such systems, the navigation system offers the user an option to elect an alternate route based upon whether the driver observes a condition at an upcoming intersection which, if true, would favor one maneuver at the intersection and, if false, would favor a different maneuver at the intersection.

It is further noted that some in-vehicle navigation systems have been proposed that obtain and use real-time traffic information. According to one type of proposed system, data about traffic congestion in a geographic area are collected by a traffic information service. The collected traffic data are filtered and processed. Then, the traffic information service broadcasts messages that contain information about the traffic congestion along roads in the geographic area. The in-vehicle navigation systems in the vehicles traveling in the geographic area include equipment that receive the messages. Programming in the in-vehicle navigation systems uses the information about traffic congestion when calculating optimal routes and when providing route guidance.

Although these types of proposed systems can be beneficial to vehicle users, these types of systems rely on the user to interact with the navigation system to cause it to calculate alternate routes or rely on the collection and broadcasting of traffic congestion information by a traffic information service. The driver may not always be in a position to observe the conditions required to instruct the navigation system to calculate an alternate route, or the driver simply may not want to interact with the navigation system in such fashion. Further, many geographic regions may not have a traffic information service that collects traffic data and broadcasts messages that can be used by in-vehicle navigation systems. Likewise, not all navigation systems may have receivers obtaining such traffic data, or may not have route calculation programs capable of accounting for such traffic data in calculating routes. Further still, even if a traffic information service is available in a geographic area and the navigation system can receive and utilize such traffic information, the traffic information service may collect and broadcast traffic congestion data about only certain roads (e.g., those that have the highest volume of traffic). If the driver of the vehicle with the in-vehicle navigation system is traveling on a road that is not covered by the traffic information service, he/she may not be able to obtain up-to-date traffic information. Even where the traffic information is available for all of the roads along the route, the broadcast traffic information may lag the real-time occurrence of certain types of incidents causing congestion that may favor the calculation of an alternate route.

Accordingly, there continues to be a need to provide alternate ways to provide navigation assistance to a vehicle driver using a navigation system.

SUMMARY OF THE INVENTION

To address these and other objectives, the present invention comprises a feature for a navigation system that provides alternate routes. According to this feature, the navigation system calculates one or more alternate routes upon detecting that the actual time of travel of the vehicle along the route to its current position exceeds the time estimated by the navigation system to travel to such point by a given threshold amount. The navigation system provides these one or more alternate routes to the driver. This feature enables actual conditions that may be retarding the pace of travel along the calculated route to be taken into account by the navigation system without the need for driver intervention or the receipt and/or use of traffic information broadcasts.

DETAILED DESCRIPTION OF THE PRESENTLY PREFERRED EMBODIMENTS

I. Overview of Navigation System

Figure 1:
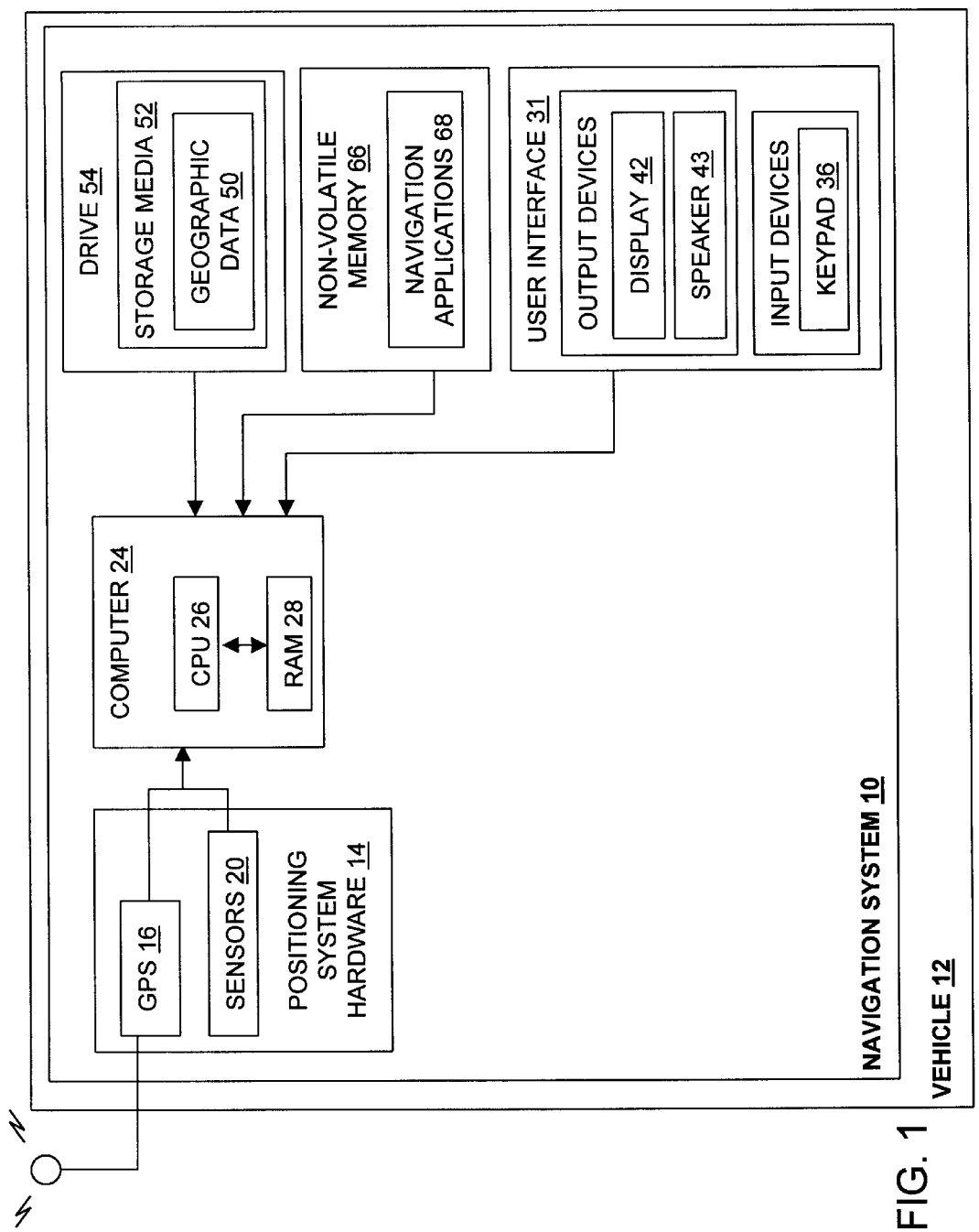
FIG. 1 is a block diagram showing components of an exemplary navigation system used in conjunction with a first embodiment.

Referring to FIG. 1, there is a diagram illustrating an exemplary configuration of a navigation system 10. The navigation system 10 is a combination of hardware and software components. In one embodiment, the navigation system 10 is located in an automobile 12. The navigation system 10 includes appropriate positioning system hardware 14 which in an exemplary embodiment may include a GPS system 16 and other sensor equipment 20 that senses the vehicle speed, heading, acceleration, etc. In addition, the navigation system 10 includes an appropriate computer 24, including a CPU 26 and memory 28 as well as other appropriate hardware.

Figure 2:
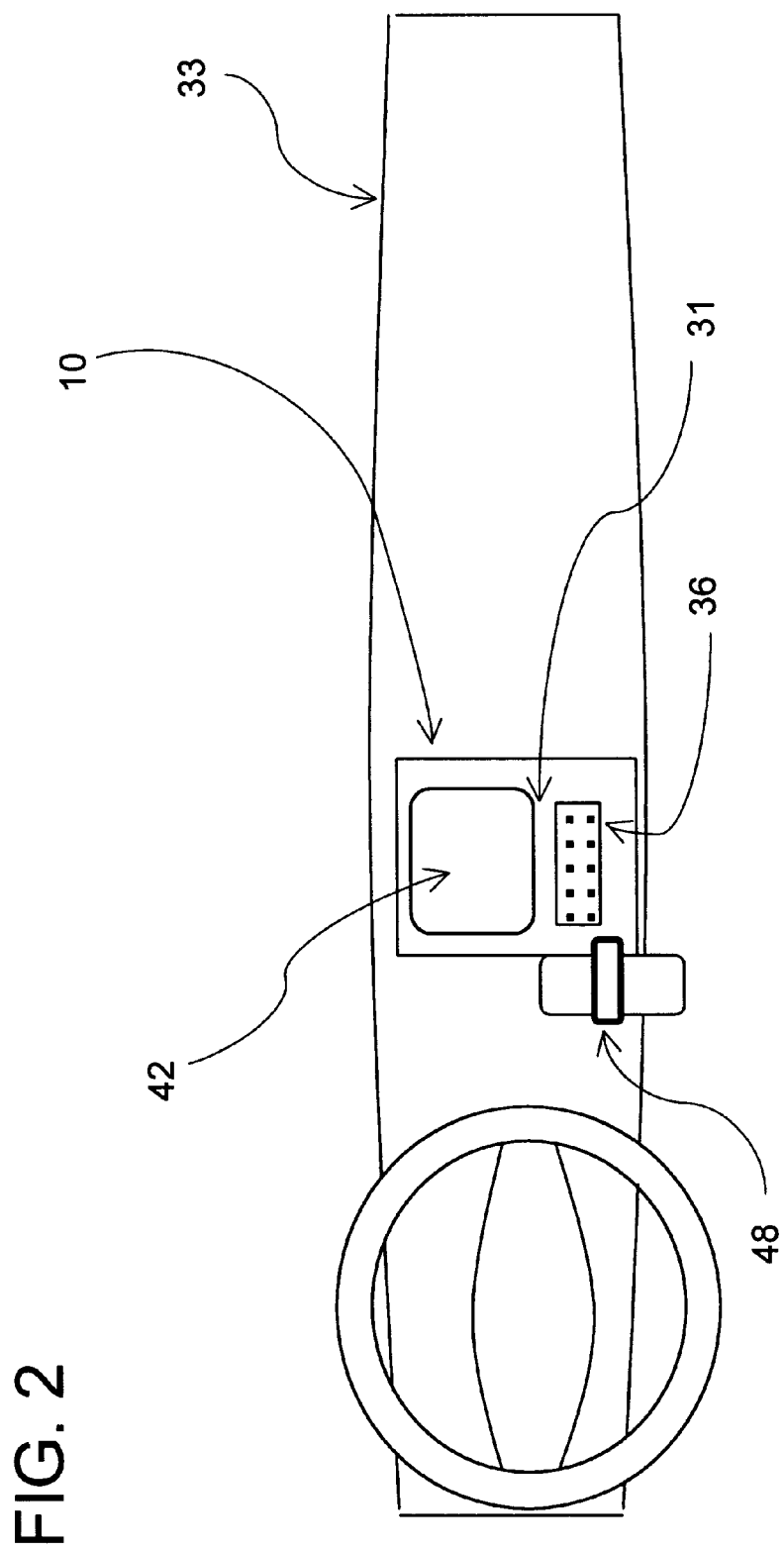
FIG. 2 is an illustration of a vehicle dashboard in which the navigation system of FIG. 1 is installed.

Also included as part of the navigation system 10 is a user interface 31 coupled to the computer 24. The user interface 31 includes appropriate means for receiving instructions and input from a user as well as means for providing information back to the user. FIG. 2 shows parts of the user interface 31. In FIG. 2, the navigation system 10 is shown installed in a dashboard 33 of the vehicle 12. The user interface 31 is installed on a front panel of the navigation system 10 so that it is accessible to the driver and/or passengers. The user interface 31 includes an input keypad 36 and possibly other input hardware and software, such as a microphone, voice recognition software, and so on, through which the driver (or passenger) can request navigation information and services. The user interface 31 may also include output hardware and software, such as a display screen 42, speakers 43 (shown in FIG. 1), speech synthesis software, etc., through which the driver or passengers can be provided with information from the navigation system 10. The user interface 31 may also include a remote control unit 48 mounted in a bracket located on a front panel of the navigation system 10. The remote control unit 48 may include its own input keys and possibly a display screen.

Referring again to FIG. 1, all of the components described above may be conventional (or other than conventional) and the manufacture and use of these components are known to those of skill in the art. For example, the processor 26 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable.

In order to provide navigation features to an end user, the navigation system 10 uses geographic data 50. The geographic data 50 includes information about one or more geographic regions or coverage areas. The geographic data 50 may be stored in the vehicle 12 or, alternatively, the geographic data 50 may be stored remotely and made available to the navigation system 10 in the vehicle 12 through a wireless communication system which may be part of the navigation system 10. In another alternative, a portion of the geographic data 50 may be stored in the vehicle 12 and a portion of the geographic data 50 may be stored in a remote location and made available to the navigation system 10 in the vehicle 12 over a wireless communication system from the remote location.

In the embodiment shown in FIG. 1, some or all of the geographic data 50 are stored on a medium 52 which is located in the vehicle 12. Accordingly, the navigation system 10 includes a drive 54 (or other suitable peripheral device) into which the medium 52 can be installed and accessed. In one embodiment, the storage medium 52 is a CD-ROM disk. In another alternative embodiment, the storage medium 52 may be a PCMCIA card in which case the drive 54 would be substituted with a PCMCIA slot. Various other storage media may be used, including fixed or hard disks, DVD disks or other currently available storage media, as well as storage media that may be developed in the future.

The geographic data 50 may be stored in the form of one or more computer-readable data files or databases. The geographic data 50 may include information about the positions of roads and intersections in or related to a specific geographic region or area, and may also include information about one-way streets, turn restrictions, street names, street addresses and/or address ranges along the roads, the lengths of roads and/or the distance between intersections along the roads, speed limits along the roads, measured and/or relative and/or predicted time of travel along various road segments, alternative routes, hotels, restaurants, museums, stadiums, offices, automobile dealerships, auto repair shops, etc. The geographic data 50 may take a variety of different forms. The geographic data 50 include data entities corresponding to "segments" and "nodes." A "segment" is a data entity that represents a portion of a navigable roadway in the geographic region and a "node" is a data entity that represents a point in the geographic region. A "segment" has two "nodes" associated with it, one at each end.

In one embodiment, the geographic data are developed and provided by Navigation Technologies Corporation of Rosemont, Ill., however it is understood that data developed and provided by other entities may also be suitable for use with the inventive subject matter disclosed herein.

II. The Navigation Programming

The navigation system 10 may include another storage device 66 (or ROM) which is used to store navigation programming 68. Alternatively, the geographic data 50 and the navigation programming 68 may be provided on a single storage device or medium. The navigation programming 68 may include separate applications (or subprograms). These applications provide various navigation-related features to the user of the navigation system 10. These features may include route calculation, route guidance (wherein detailed directions are provided for reaching a desired destination), map display, vehicle positioning (e.g., map matching), and so on. The navigation applications may be written in a suitable computer programming language such as C, C++, Java, Visual Basic, etc.

During a typical use of the navigation system 10 of FIG. 1, some or all the applications included in the navigation programming 68 are loaded from the ROM 66 into the memory 28 associated with the processor 26. The computer 24 receives input from the user interface 31. The input may include a request for navigation-related information. Information is obtained from the positioning system hardware 14 indicating a position of the vehicle 12. The information from the positioning system hardware 14 may be used by the navigation programming 68 that is run on the processor 26 to determine the location, direction, speed, etc., of the navigation system 10, and hence the vehicle. The navigation programming 68 uses the geographic data 50 stored on the storage medium 52, possibly in conjunction with the outputs from the positioning system hardware 14, to provide various navigation-related functions and features. The features provided by these navigation applications are provided to the user (e.g., the vehicle driver) by means of the user interface 31.

Figure 3:
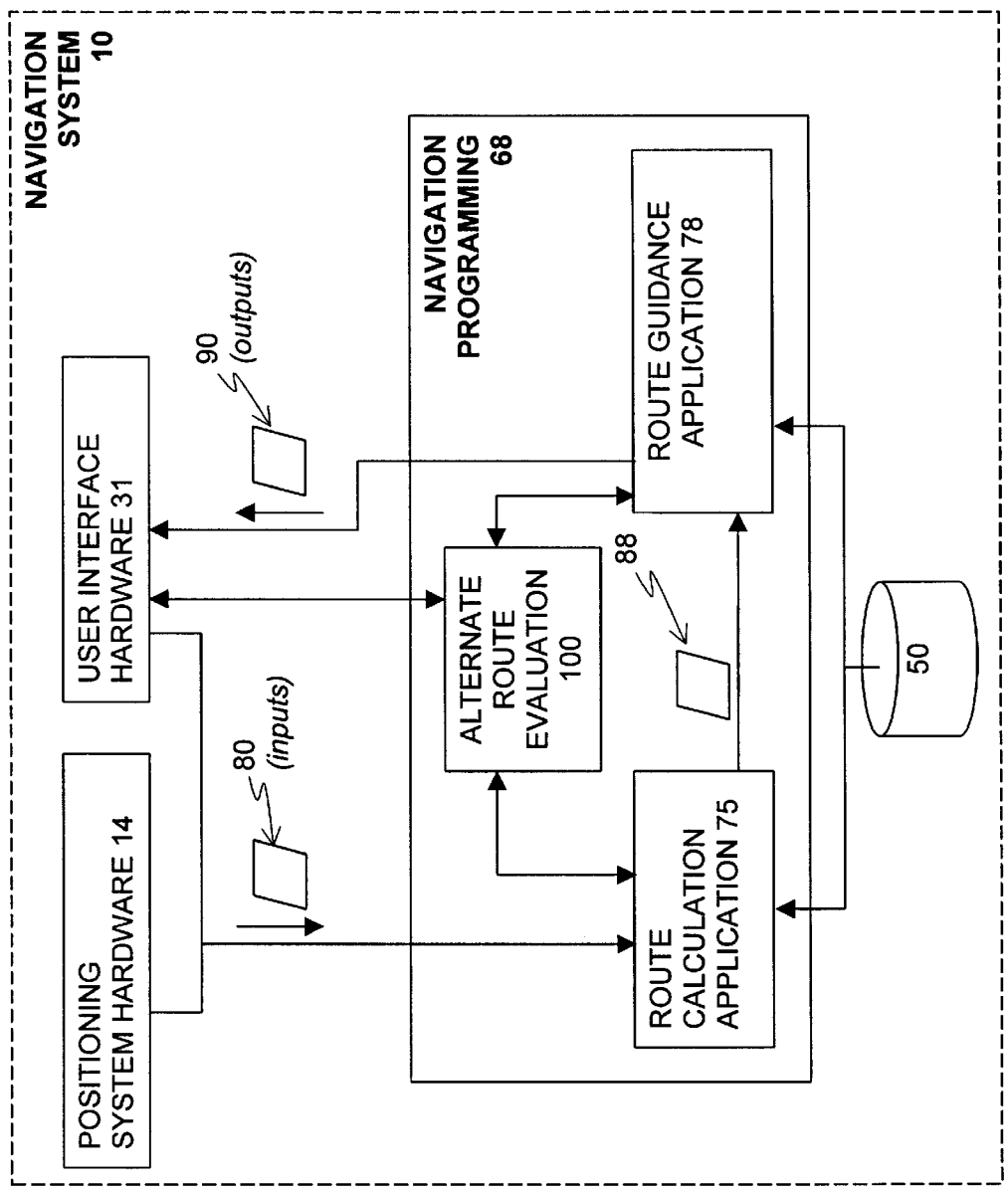
FIG. 3 is a block diagram showing portions of the navigation application programming in FIG. 1.

FIG. 3 is block diagram representing a portion of the navigation programming 68. The portion of the navigation programming 68 shown in FIG. 3 includes a route calculation application 75 and a route guidance application 78. The route calculation application 75 calculates a route from an origin location to a destination location. The route guidance application 78 provides instructions to the vehicle driver for following the route calculated by the route calculation application 75. In FIG. 3, the route calculation application 75 receives inputs 80. The inputs 80 are derived from the positioning system hardware 14 and/or user interface 31 (shown in FIGS. 1 and 2).

The inputs 80 include identifications of an origin and destination. Using these inputs 80, the route calculation application 75 calculates a route from the origin to the destination. The route calculation application 75 may use any of various means or algorithms for this purpose. For example, the route calculation application 75 may use either the A* algorithm or the Dykstra algorithm. Methods for calculating routes are disclosed in Ser. No. 08/893,201, filed Mar. 25, 1998, the entire disclosure of which is incorporated by reference herein. (The methods disclosed in the aforementioned patent application represent only some of the ways that routes can be calculated and the subject matter claimed herein is not limited to any particular method of route calculation. A suitable route calculation method now known or developed in the future may be employed.)

Regardless of the method used, the objective of the route calculation application 75 is to develop a list identifying a continuous series of road segments that form a legally valid solution route between the origin and destination. (A "legally valid solution route" conforms to known traffic restrictions, such as one way streets, turn restrictions, etc.) The method used by the route calculation application 75 may be designed to optimize the solution route to meet one or more predetermined criteria. Such criteria may include the least travel time, the shortest distance, the fewest turns, most scenic, etc. If the method used by the route calculation application 75 is designed to find a solution route that is optimized for one or more criteria, then the solution route also ideally meets these one or more criteria. In determining a route based on least travel time, the route calculation application 75 considers the time of travel information (such as distance and speed limit, measured time of travel, relative time of travel, and/or predicted time of travel) associated with the segments and nodes. The route calculation application 75 additionally may consider externally available time of travel information, such as broadcast traffic information. After the route calculation application 75 has found a solution route, an output 88 is provided to the route guidance application 78.

Figure 4:
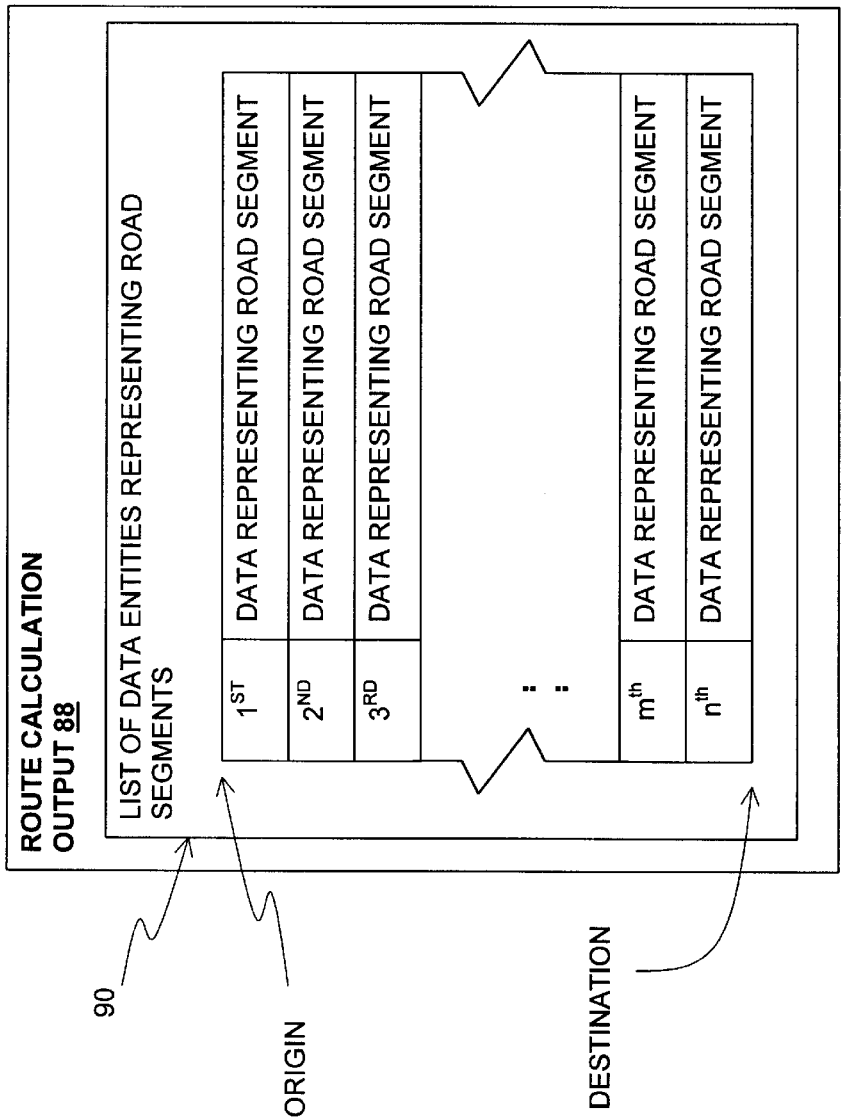
FIG. 4 is a block diagram showing some of the components of the output of the route calculation application of FIG. 3.

FIG. 4 is a diagram representing the components of the output 88 of the route calculation application 75. The route calculation output 88 contains an ordered list 90. Each entry in the ordered list 90 identifies a road segment in the solution route. Each road segment that forms part of the solution route between the origin and the destination may be identified by a data entity that represents the road segment. Using information relating to the time of travel for each of the segments and associated nodes of the solution route, the route calculation application 75 can estimate the time it will take to traverse the route.

Referring again to FIG. 3, using the data in the output 88 of the route calculation application 75, the route guidance application 78 forms instructions 90 to be provided to the vehicle driver to follow the calculated route to the destination. The instructions 90 may be provided to the vehicle driver via the user interface 31. The instructions 90 may be provided as audible instructions using the speaker 43 of the user interface 31. The instructions may be provided visually as text, symbols, maps, graphical displays, and so on, using the display screen 42 of the user interface 31.

III. Alternate Route Evaluation Feature

Although navigation systems can provide numerous advantages to drivers, prior navigation systems have not provided a means to incorporate an available and potentially very useful source of navigation-related information, namely driver-experienced conditions. Accordingly, a present embodiment provides a means by which driver-experienced conditions can be incorporated into the guidance provided by a navigation system.

The driver-experienced conditions may include any kinds of conditions that retard the rate of travel. For example, the driver-experienced conditions may include traffic congestion conditions, as well as conditions that contribute to traffic congestion, such as traffic incident conditions, scenic conditions, road surface conditions, road construction conditions, road size conditions, weather conditions, or any other types of conditions.

In a first embodiment, the navigation system 10 includes an alternate route evaluation feature. The alternate route evaluation feature is provided by programming in the navigation system 10. Referring to FIG. 3, the alternate route evaluation feature may be provided as a separate application 100 in the navigation programming 68. Alternatively, the alternate route evaluation feature may be provided as part of another application, such as the route calculation application 75 or the route guidance application 78. The alternate route evaluation feature 100 uses portions of the route calculation application 75 and the route guidance application 78. The alternate route evaluation feature 100 also receives input from and provides output to the user interface 31.

The alternate route evaluation feature 100 may be operated in several different modes. In one mode of operation, the alternate route evaluation feature operates automatically to compare the actual travel time of the vehicle along the calculated route to the estimated travel time on a continuous or periodic basis and to invoke the route calculation application to calculate alternate routes to the destination if the actual travel time exceeds the estimated travel time by a given threshold. In another alternative mode of operation, the alternate route evaluation feature operates automatically to compare the actual travel time of the vehicle along the calculated route to the estimated travel time on a continuous or periodic basis, but merely alerts the driver and offers to calculate alternate routes if the actual travel time exceeds the estimated travel time by a given threshold. In another alternative mode of operation, the alternate route evaluation feature is invoked upon an input from the driver requesting the feature. Upon request, the alternate route evaluation feature compares the actual travel time of the vehicle along the calculated route to the estimated travel time. If the actual time of travel exceeds the estimated time of travel by a given threshold, then the alternate route evaluation feature can either invoke the route calculation to calculated alternate routes or, instead, alert the driver and offer to calculate alternate routes.

A. First Embodiment

Figure 5:
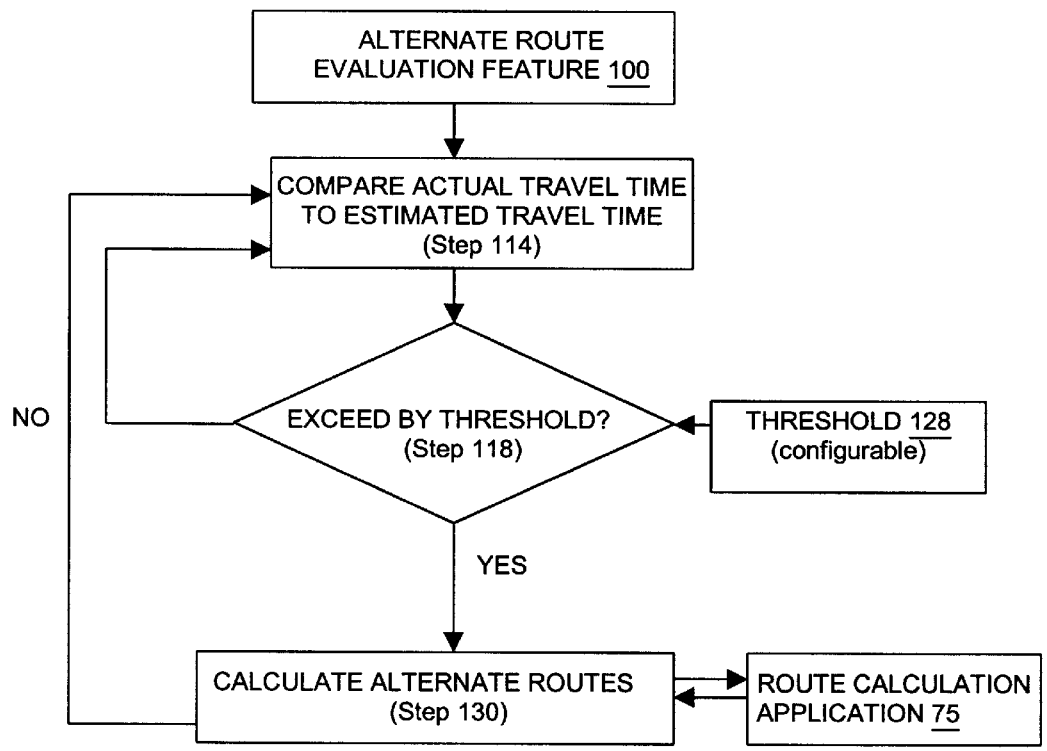
FIG. 5 is a flow chart showing steps performed by a first embodiment of the alternate route evaluation feature shown in FIG. 3.

FIG. 5 is a flow chart showing a mode of operation of the alternate route evaluation feature 100. According to this mode of operation, the alternate route evaluation feature compares the actual travel time of the vehicle along the route to the travel time that had been estimated by the route calculation application 75 (Step 114). The comparison occurs on a periodic basis, e.g., every 60 seconds or every 0.1 miles. The period for comparison is configurable, and can be based on any available parameter or variable. If the actual time of travel exceeds the estimated travel time, then the alternate route evaluation feature evaluates whether the difference between the actual time of travel and the estimated time or travel exceeds the threshold 128 (Step 118). If not, then the alternate route evaluation feature returns to Step 114 and continues to compare the actual and estimated travel times. If the actual time of travel exceeds the estimated time of travel by the threshold, then the alternate route evaluation feature invokes the route calculation application 75 to calculate alternate routes (Step 130).

Methods for calculating alternate routes are well known in the art. The subject matter claimed herein is not limited to any particular method of alternate route calculation. A suitable alternate route calculation method now known or developed in the future may be employed. The alternate routes may be calculated to avoid the original route as much as possible. Alternatively, the alternate routes may be calculated to avoid at least the portion of the original calculated route immediately ahead of the vehicle (based on the assumption that the vehicle is currently caught in a traffic jam).

B. Second Embodiment

Figure 6:
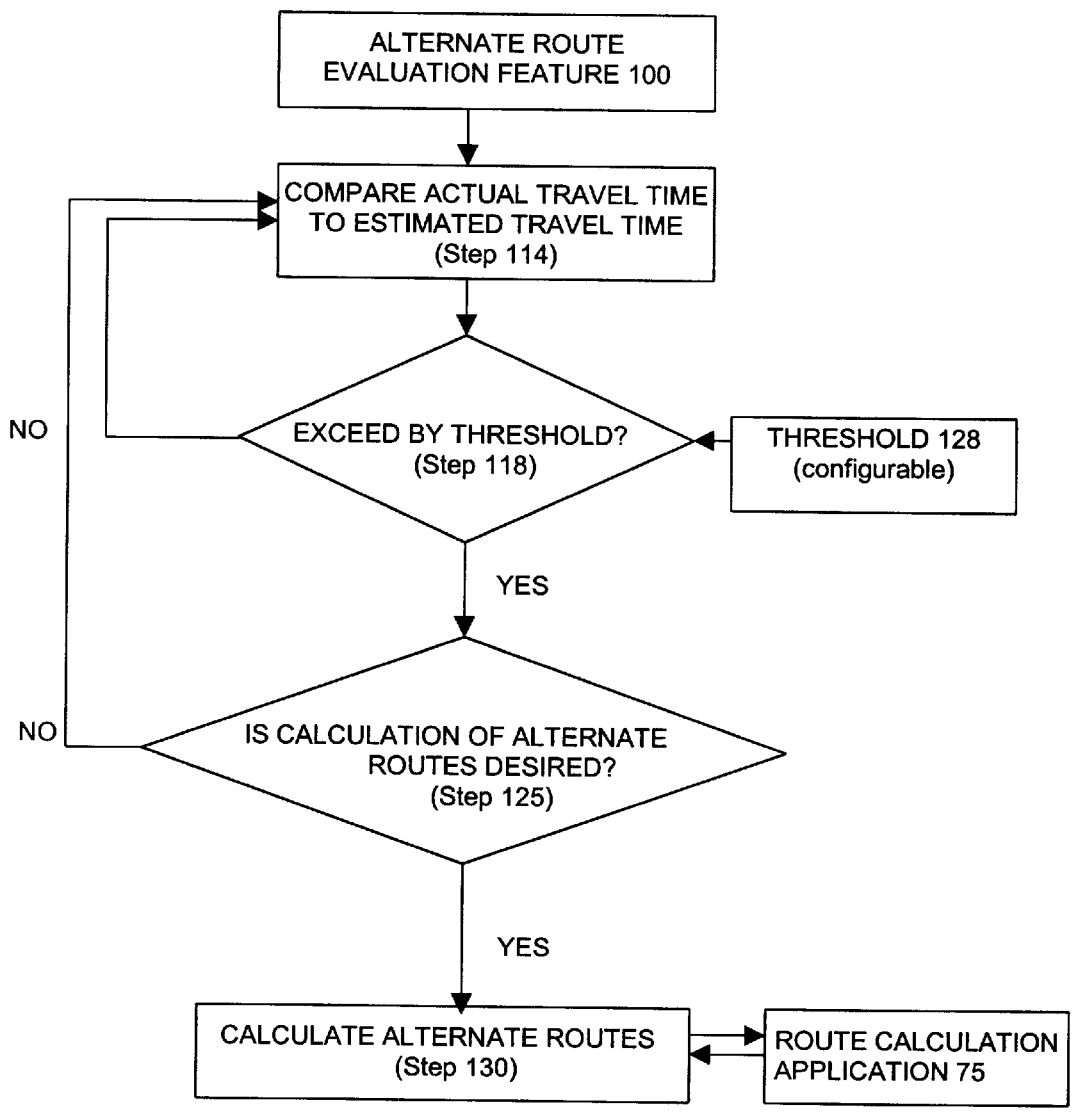
FIG. 6 is a flow chart showing steps performed by a second embodiment of the alternate route evaluation feature shown in FIG. 3.

FIG. 6 is a flow chart showing an alternative mode of operation of the alternate route evaluation feature 100. According to this mode of operation, the alternate route evaluation feature compares the actual travel time of the vehicle along the route to the travel time that had been estimated by the route calculation application 75 (Step 114). The comparison occurs on a periodic basis, e.g., every 60 seconds or every 0.1 miles. The period for comparison is configurable, and can be based on any available parameter or variable. If the actual time of travel exceeds the estimated travel time, then the alternate route evaluation feature evaluates whether the difference between the actual time of travel and the estimated time or travel exceeds the threshold 128 (Step 118). If not, then the alternate route evaluation feature returns to Step 114 and continues to compare the actual and estimated travel times. If the actual time of travel exceeds the estimated time of travel by the threshold, then the alternate route evaluation feature requests the user to indicate whether alternate routes are desired (Step 125). If not, then the alternate route evaluation feature returns to Step 114 and continues to compare the actual and estimated travel times. If the user indicates that calculation of alternate routes is desired, then the alternate route evaluation feature invokes the route calculation application 75 to calculate alternate routes (Step 130).

C. Third Embodiment

Figure 7:
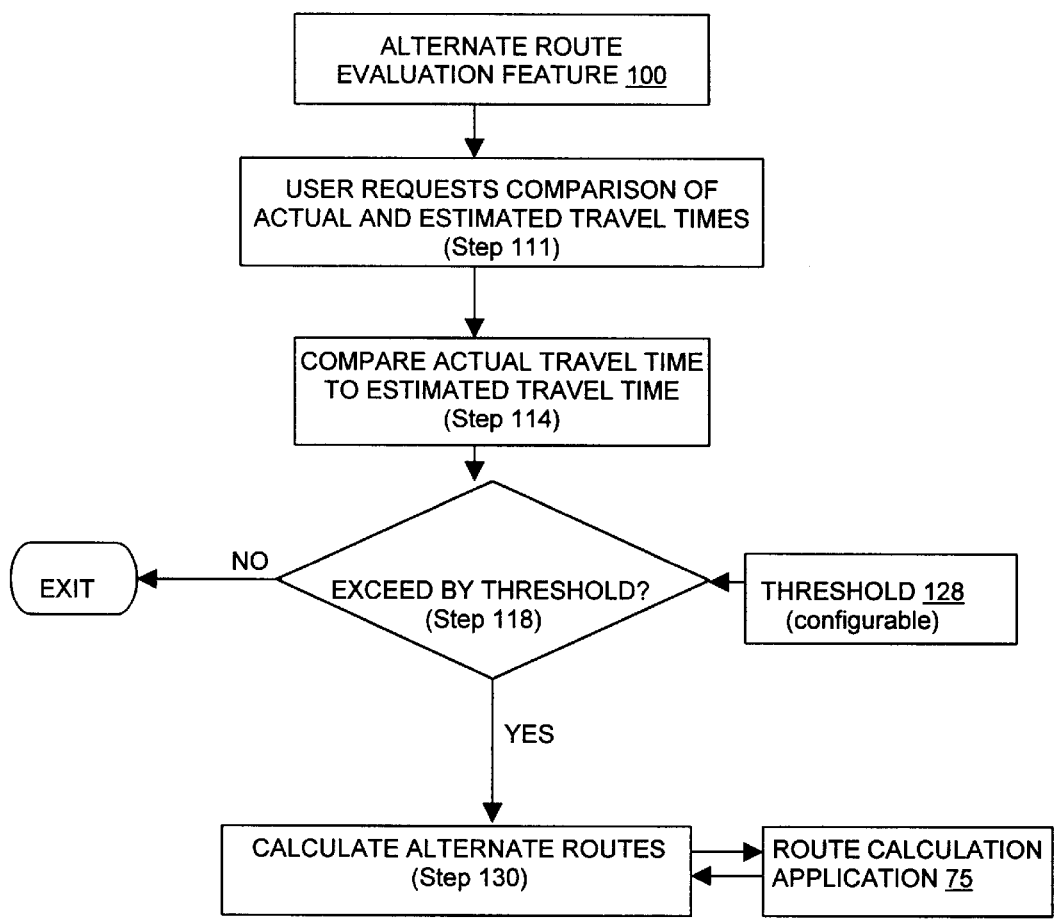
FIG. 7 is a flow chart showing steps performed by a third embodiment of the alternate route evaluation feature shown in FIG. 3.

FIG. 7 is a flow chart showing a further alternative mode of operation of the alternate route evaluation feature 100. According to this mode of operation, the alternate route evaluation feature compares the actual travel time of the vehicle along the route to the travel time that had been estimated by the route calculation application 75, only upon request by the user (Step 111). The user may request the alternate route evaluation feature 100 by operating the input device keypad 36 or other manual input device of the user interface to select the alternate route evaluation feature 100 from an appropriate menu presented on the display 42 of the user interface 31. Alternatively, the alternate route evaluation feature 100 may be activated by the user using voice commands if supported by the user interface 31. If the user requests the alternate route evaluation feature (Step 111), a comparison is made between the actual time of travel and the estimated time of travel (Step 114). If the actual time of travel exceeds the estimated travel time, then the alternate route evaluation feature evaluates whether the difference between the actual time of travel and the estimated time or travel exceeds the threshold 128 (Step 118). If not, then the alternate route evaluation feature is exited, and remains available for future requests by the user. If the actual time of travel exceeds the estimated time of travel by the threshold, then the alternate route evaluation feature invokes the route calculation application 75 to calculate alternate routes (Step 130).

D. Fourth Embodiment

Figure 8:
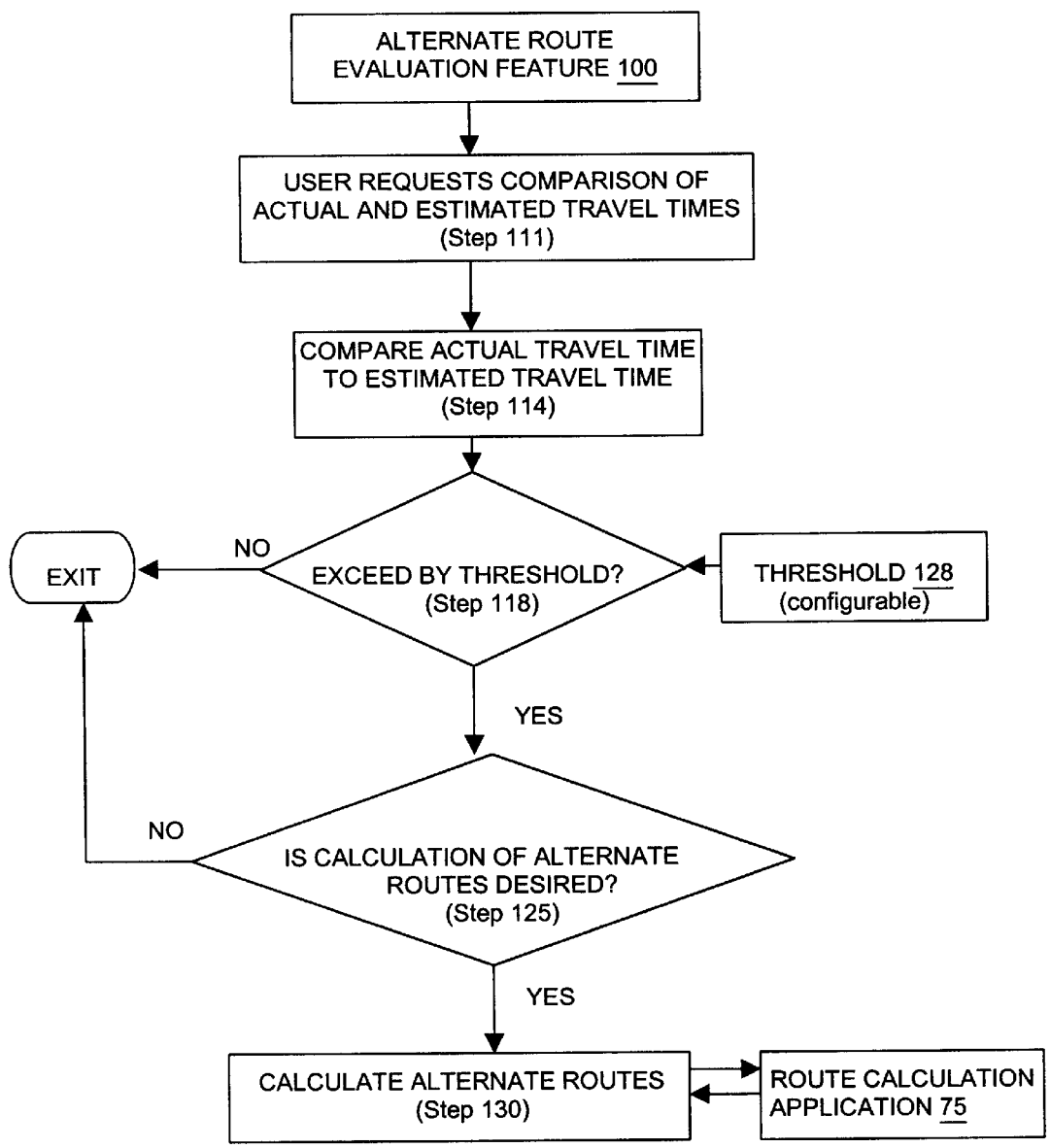
FIG. 8 is a flow chart showing steps performed by a fourth embodiment of the alternate route evaluation feature shown in FIG. 3.

FIG. 8 is a flow chart showing another further alternative mode of operation of the alternate route evaluation feature 100. According to this mode of operation, the alternate route evaluation feature compares the actual travel time of the vehicle along the route to the travel time that had been estimated by the route calculation application 75, only upon request by the user (Step 111). The user may request the alternate route evaluation feature 100 by operating the input device keypad 36 or other manual input device of the user interface to select the alternate route evaluation feature 100 from an appropriate menu presented on the display 42 of the user interface 31. Alternatively, the alternate route evaluation feature 100 may be activated by the user using voice commands if supported by the user interface 31. If the user requests the alternate route evaluation feature (Step 111), a comparison is made between the actual time of travel and the estimated time of travel (Step 114). If the actual time of travel exceeds the estimated travel time, then the alternate route evaluation feature evaluates whether the difference between the actual time of travel and the estimated time or travel exceeds the threshold 128 (Step 118). If not, then the alternate route evaluation feature is exited, and remains available for future requests by the user. If the actual time of travel exceeds the estimated time of travel by the threshold, then the alternate route evaluation feature requests the user to indicate whether alternate routes are desired (Step 125). The user may respond to this request by operating the input device keypad 36 or other manual input device of the user interface or by using voice commands if supported by the user interface 31. If the user indicates that alternate routes are not desired, then the alternate route evaluation feature is exited, and remains available for future requests by the user. If the user indicates that calculation of alternate routes is desired, then the alternate route evaluation feature invokes the route calculation application 75 to calculate alternate routes (Step 130).

E. Fifth Embodiment

According to another embodiment, the alternate route evaluation feature can be operated in a mode where the user does not have the navigation system calculate a solution route to the destination beforehand. Instead, the user indicates a destination to the navigation system. Then, the user begins to drive toward the destination. The navigation system determines the segments on which the vehicle travels.

In a first mode of this embodiment, the navigation system calculates the estimated time of travel along the identified segments on a periodic basis, e.g., every 60 seconds or every 0.1 miles. The period is configurable, and can be based on any available parameter or variable. Referring to Step 114 of FIGS. 5, 6, 7 and 8, in the current embodiment, a comparison is made between the actual time of travel of the vehicle along the identified segments to the estimated time of travel along those segments. This embodiment would otherwise work as shown in the flow charts of FIGS. 5–8, except that at Step 130 the route calculation application 75 would identify at least two routes to the destination, since the route intended by the driver would be unknown to the navigation system. By providing such at least two alternate routes, it would be ensured that at least one route is not the one which the user intended to travel.

In a second mode of this embodiment, the navigation system calculates the estimated time of travel along the identified segments only when so requested by the user (see Step 111 of FIGS. 7 and 8). Referring to Step 114 of FIGS. 7 and 8, in the current embodiment, a comparison is made between the actual time of travel of the vehicle along the identified segments to the estimated time of travel along those segments. This embodiment would otherwise work as shown in the flow charts of FIGS. 7 and 8, except that at Step 130 the route calculation application 75 would identify at least two routes to the destination, since the route intended by the driver would be unknown to the navigation system. By providing such at least two alternate routes, it would be ensured that at least one route is not the one which the user intended to travel.

F. Estimated Time of Travel

In each of the aforementioned modes of operation, when calculating routes and alternate routes, the route calculation application 75 determines an estimated time of travel for the route. The route calculation application 75 determines the estimated time of travel based on time of travel information associated with each road segment and intersection. In the geographic database 50, each represented road segment is associated with time of travel information, such as distance and speed limit, measured time of travel, relative time of travel and/or predicted time of travel. Time of travel information may additionally include information relating to stop signs or other traffic restrictions along the road segment, etc.

The estimated time of travel for a road segment (or an intersection) may be determined based upon various considerations, such as the speed limit along the road segment, the measured time of travel along the segment, stop signs or other traffic restrictions along the road segment, etc. The time of travel information associated with a road segment in the geographic database does not necessarily take into account out of the ordinary conditions. For example, the time of travel information would not take into account traffic congestion caused by an accident. The time of travel information may not take into account rush hour traffic conditions. Alternatively, the time of travel information could include or reflect information for predictable traffic conditions at various times of the day or on certain days.

G. Threshold

In any of the modes of operation described above, the threshold 128 may be based on either a fixed deviation of time (such as "5 minutes") or a relative deviation of time (such as "25%"). Alternatively, the threshold 128 may be based on a combination of fixed and relative deviations of time, such as where both thresholds (5 minutes and 25%) must be met, or where each of the fixed and relative deviations may be weighted and must add up to a predefined threshold amount. Also, the threshold 128 may be configurable by the user. A setup program included in the programming 68 may be used for this purpose. The end user may be able to access a menu on the display from which a value for the threshold may be selected. For example, the threshold factor may be set by the end user at 5 minutes, 10 minutes, 15 minutes, and so on. Likewise, the threshold factor may be set by the end user at 10%, 25%, 50%, 100%, and so on.

The threshold 128 can be set so that it only applies in certain situations. For example, the route evaluation feature 100 may be disabled to not operate for relatively short routes or when the vehicle has traveled within a predefined distance from the destination.

H. Replacement of Original Route with Alternate Route

In any of the modes of operation described above, where the alternate route evaluation feature 100 invokes the route calculation application 75 to calculate alternate routes, the best solution alternate route (e.g., the shortest alternate route or the alternate route with the lowest estimated travel time) is automatically selected and route guidance for the alternate route is provided by the route guidance application 78 (see FIG. 3).

I. Alternative Presentation of Alternate Routes

In the embodiment described above, the best alternate route is automatically selected by the alternate route evaluation feature 100. In alternative embodiment, the alternate route evaluation feature 100 can be configured to not return an alaternate route if the best alternate solution is significantly slower than the remaining estimated time of travel for the original claculated route. For example, if the vehicle is 10 minutes behind the estimated time of travel and the best alternate route would be expected to take 60 minutes more than the current route, the feature would not necessarily return the alternate route to the driver.

In another alternative embodiment, the alternate route evaluation feature 100 can present the best solution route to the user and request the user to indicate whether the user desires guidance for the alternate route. As a further alternative, the route evaluation feature can present more than one alternate route to the user and request the user to select one of the alternate routes, if any, for which route guidance is desired. In this latter mode, the alternate route evaluation feature can display or otherwise communicate to the user the estimated time of travel and/or distance for each of the alternate routes, and/or the relative or incremental differences for each of the routes (compared to either each other or to the original calculated route), and/or any other numeric rating or other designation to assist the end user in making a selection.

J. Background operation

The alternate route evaluation feature 100 may be operated in the background while the vehicle is being driven along the original calculated route. In this way, when the user selects the alternate route evaluation feature 100, the evaluation results may be provided to the user very quickly. Whether the alternate route evaluation feature operates in the background may be configured by the end user.

K. User-selection of route suppression

According to another alternative, when the alternate route evaluation feature is used, the user may be aware that specific road segments should be avoided in calculating alternate routes. According to this embodiment, the user is given a means to identify road segments to avoid. These road segments may or may not comprise portions of the original solution route. Then, when the alternate route evaluation feature is used to calculate alternate routes, these identified roads segments are not included in any possible alternate routes.

It is intended that the foregoing detailed description be regarded as illustrative rather than limiting and that it is understood that the following claims including all equivalents are intended to define the scope of the invention.

We claim:

1. A program, for use with a vehicle navigation system capable of calculating a route from an origin to a destination, estimating a time of travel from said origin to said destination, and determining a location of a vehicle and an actual time of travel of said vehicle along said route, comprising:

means for determining whether the actual time of travel of said vehicle to a position along said route exceeds an estimated time of travel to said position along said route by a threshold amount of time; and means for automatically initiating calculation of one or more alternate routes to said destination when said actual time of travel exceeds said estimated time of travel by said threshold amount of time.

2. The program of claim 1 wherein said threshold amount is configurable.

3. The program of claim 1 wherein said threshold amount is based on a fixed amount of time.

4. The program of claim 1 wherein said threshold amount is based on a relative amount of time.

5. The program of claim 1 wherein said threshold amount is based on both a fixed amount of time and a relative amount of time.

6. The program of claim 1 wherein said means for determining whether the actual time of travel of said vehicle to a position along said route exceeds an estimated time of travel to said position along said route by a threshold amount is invoked only upon input by a user requesting such determination.

7. The program of claim 1 wherein said means for determining whether the actual time of travel of said vehicle to a position along said route exceeds an estimated time of travel to said position along said route by a threshold amount is invoked automatically on a periodic basis.

8. A vehicle navigation system comprising:

a route calculator, capable of calculating a route of travel along roadways from an origin to a destination;

a route travel time estimator, capable of estimating a time of travel along roadways of a route calculated by said route calculator;

a vehicle position locator, capable of determining the position of a vehicle relative to a roadway;

an actual time of travel calculator, capable of determining the actual time of travel of said vehicle along a route calculated by said route calculator;

a threshold parameter;

a travel time deviation calculator, capable of determining with respect to at least a portion of a route calculated by said route calculator whether an actual time of travel determined by said actual time of travel calculator exceeds an estimated time of travel determined by said route travel time estimator by a given amount based on said threshold parameter; and an alternate route calculator capable of calculating an alternate route of travel along roadways to said destination.

9. The navigation system of claim 8 wherein said travel time deviation calculator operates automatically on a periodic basis.

10. The navigation system of claim 8 wherein said travel time deviation calculator operates only upon input by a user requesting such operation.

11. The navigation system of claim 8 or 9 wherein said alternate route calculator is responsive to said travel time deviation calculator.

12. The navigation system of claim 9 wherein said alternate route calculator calculates an alternative route of travel along roadways to said destination automatically upon a determination by said travel time deviation calculator that said actual time of travel exceeds said estimated time of travel by said threshold parameter.

13. The navigation system of claim 11 wherein said alternate route calculator calculates an alternative route of travel along roadways to said destination automatically upon a determination by said travel time deviation calculator that said actual time of travel exceeds said estimated time of travel by said threshold parameter.

14. The navigation system of claim 8, 9 or 10 wherein said alternate route calculator is responsive only upon input by a user requesting calculation of an alternate route of travel along roadways to said destination.

15. The navigation system of claim 8 wherein said route travel time estimator estimates a time of travel along roadways of a route calculated by said route calculator based on one or both of distance and speed limit information relating to said roadways.

16. The navigation system of claim 8 wherein said route travel time estimator estimates a time of travel along roadways of a route calculated by said route calculator based on measured time of travel relating to said roadways.

17. The navigation system of claim 8 wherein said route calculator calculates a route of travel along roadways from an origin to a destination in consideration of broadcast traffic information.

18. The navigation system of claim 8 wherein said threshold parameter is configurable.

19. The navigation system of claim 8 wherein said threshold parameter is based on a fixed amount of time.

20. The navigation system of claim 8 wherein said threshold parameter is based on a relative amount of time.

21. The navigation system of claim 8 wherein said threshold parameter is based on both a fixed amount of time and a relative amount of time.

22. A vehicle navigation system comprising:

a route calculator, capable of calculating a route of travel along roadways from an origin to a destination;

a route travel time estimator, capable of estimating a time of travel along roadways of a route calculated by said route calculator;

a vehicle position locator, capable of determining the position of a vehicle relative to a roadway;

an actual time of travel calculator, capable of determining the actual time of travel of said vehicle along a route calculated by said route calculator;

a threshold parameter;

a travel time deviation calculator, capable of determining with respect to at least a portion of a route calculated by said route calculator whether an actual time of travel determined by said actual time of travel calculator exceeds an estimated time of travel determined by said route travel time estimator by a given amount based on said threshold parameter; and an alternate route calculator capable of calculating an alternate route of travel along roadways to said destination, wherein said alternate route calculator is disabled where an estimated time of travel is less than a pre-determined amount.

23. The navigation system of claim 8 wherein said alternate route calculator calculates one or more alternate routes upon a determination by said travel time deviation calculator that said actual time of travel exceeds said estimated time of travel by said given amount based on said threshold parameter.

24. The navigation system of claim 23 wherein at least one of said one or more alternate routes calculated by said alternate route calculator is offered to a user of the navigation system for selection.

25. The navigation system of claim 23 wherein an alternate route calculated by said alternate route calculator is not offered to a user of the navigation system for selection where the estimated time of travel for said alternate route exceeds the estimated time of travel for the remaining portion of the original route by a pre-determined amount.

26. The navigation system of claim 23 wherein at least one of said one or more alternate routes calculated by said alternate route calculator includes portions of the original route.

27. A method in a navigation system, comprising:

calculating a route of travel for a vehicle along roadways from an origin to a destination;

estimating the time of travel to one or more points along said route;

calculating the actual time of travel of said vehicle to said one or more points along said route;

determining whether said actual time of travel of said vehicle to one of said one or more points along said route exceeds said estimated time of travel to said one of said one or more points by a given amount based on a threshold parameter; and calculating one or more alternates routes to said destination upon a determination that said actual time of travel exceeds said estimated time of travel by a given amount based on said threshold parameter.

28. A method in a navigation system, comprising:

identifying a destination selected by a user of said navigation system;

identifying the roadways traveled by said user between a first location and second location;

calculating the actual time of travel of said user from said first location to said second location;

estimating the time of travel along said identified roadways between said first location and said second location;

determining whether said actual time of travel of said vehicle exceeds said estimated time of travel by a given amount based on a threshold parameter; and calculating two or more routes to said destination upon a determination that said actual time of travel exceeds said estimated time of travel by said given amount based on said threshold parameter.

29. The invention of claim 1 wherein said threshold amount of time is 5 minutes.

30. The invention of claim 1 wherein said threshold amount of time is 10 minutes.

31. The invention of claim 1 wherein said threshold amount of time is 15 minutes.

32. The invention of claim 1 wherein said threshold amount of time is 10% of said estimated time of travel.

33. The invention of claim 1 wherein said threshold amount of time is 25% of said estimated time of travel.

34. The invention of claim 1 wherein said threshold amount of time is 50% of said estimated time of travel.

35. The invention of claim 1 wherein said threshold amount of time is 100% of said estimated time of travel.

36. The system of claim 8 wherein said threshold parameter is 5 minutes.

37. The system of claim 8 wherein said threshold parameter is 10 minutes.

38. The system of claim 8 wherein said threshold parameter is 15 minutes.

39. The system of claim 8 wherein said threshold parameter is 10% of said estimated time of travel.

40. The system of claim 8 wherein said threshold parameter is 25% of said estimated time of travel.

41. The system of claim 8 wherein said threshold parameter is 50% of said estimated time of travel.

42. The system of claim 8 wherein said threshold parameter is 100% of said estimated time of travel.

43. The method of claim 27 wherein said threshold parameter is 5 minutes.

44. The method of claim 27 wherein said threshold parameter is 10 minutes.

45. The method of claim 27 wherein said threshold parameter is 15 minutes.

46. The method of claim 27 wherein said threshold parameter is 10% of said estimated time of travel.

47. The method of claim 27 wherein said threshold parameter is 25% of said estimated time of travel.

48. The method of claim 27 wherein said threshold parameter is 50% of said estimated time of travel.

49. The method of claim 27 wherein said threshold parameter is 100% of said estimated time of travel.

50. The method of claim 28 wherein said threshold parameter is 5 minutes.

51. The method of claim 28 wherein said threshold parameter is 10 minutes.

52. The method of claim 28 wherein said threshold parameter is 15 minutes.

53. The method of claim 28 wherein said threshold parameter is 10% of said estimated time of travel.

54. The method of claim 28 wherein said threshold parameter is 25% of said estimated time of travel.

55. The method of claim 28 wherein said threshold parameter is 50% of said estimated time of travel.

56. The method of claim 28 wherein said threshold parameter is 100% of said estimated time of travel.

* * * * *